(12) United States Patent
Chen et al.

(10) Patent No.: US 7,783,748 B2
(45) Date of Patent: Aug. 24, 2010

(54) METHODS AND APPARATUS FOR SAMPLING USAGE INFORMATION FROM A POOL OF TERMINALS IN A DATA NETWORK

(75) Inventors: An Mei Chen, San Diego, CA (US); Ravinder Paul Chandhok, Poway, CA (US); Gordon Kent Walker, Poway, CA (US); Ajit L. Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 538 days.

(21) Appl. No.: 11/491,472

(22) Filed: Jul. 21, 2006

(65) Prior Publication Data

US 2007/0277182 A1    Nov. 29, 2007

Related U.S. Application Data (60) Provisional application No. 60/808,615, filed on May 25, 2006.

(51) Int. Cl.
*G06F 15/173* (2006.01)
(52) U.S. Cl. .................. 709/224; 709/213
(58) Field of Classification Search .................. None
See application file for complete search history.

(56) References Cited

U.S. PATENT DOCUMENTS

| | | | |
|---|---|---|---|
| 6,529,515 B1 * | 3/2003 | Raz et al. ............. | 370/401 |
| 7,032,229 B1 | 4/2006 | Flores et al. | |
| 7,089,304 B2 * | 8/2006 | Graham ............... | 709/224 |
| 7,093,250 B1 * | 8/2006 | Rector ................. | 718/100 |
| 7,262,357 B2 | 8/2007 | Plastina et al. | |
| 7,310,511 B2 * | 12/2007 | Barnea et al. ........ | 455/408 |
| 7,343,390 B2 * | 3/2008 | Cohen et al. ......... | 709/203 |
| 7,376,654 B1 * | 5/2008 | Chau et al. ........... | 707/100 |
| 7,376,722 B1 * | 5/2008 | Sim et al. ............. | 709/223 |
| 7,451,209 B1 * | 11/2008 | Schieber et al. ...... | 709/224 |

(Continued)

FOREIGN PATENT DOCUMENTS

EP    0977389    2/2000

(Continued)

OTHER PUBLICATIONS

International Search Report—PCT/US07/069782, International Search Authority—European Patent Office—Nov. 8, 2007.

(Continued)

*Primary Examiner*—Vivek Srivastava
*Assistant Examiner*—Minh-Chau Nguyen
(74) *Attorney, Agent, or Firm*—Milan Patel; Gerald P. Joyce, III (57) ABSTRACT

Methods and apparatus for sampling usage information from a pool of terminals in a data network. A method is provided to perform usage tracking in a data network. The method includes determining a targeted set of terminals from a pool of terminals on the data network, and transmitting tracking parameters to the pool of terminals. The method also includes receiving tracking data from the targeted set of terminals, and mapping the identities of the targeted set of terminals to device log identifiers. The method also includes associating the device log identifiers with the tracking data.

34 Claims, 5 Drawing Sheets

U.S. PATENT DOCUMENTS

| | | | |
|---|---|---|---|
| 7,454,503 B2 * | 11/2008 | Childress et al. | 709/226 |
| 2004/0209595 A1 * | 10/2004 | Bekanich | 455/405 |
| 2005/0246439 A1 * | 11/2005 | Fong et al. | 709/224 |
| 2005/0262245 A1 * | 11/2005 | Menon et al. | 709/226 |
| 2006/0007901 A1 * | 1/2006 | Roskowski et al. | 370/338 |
| 2006/0040642 A1 | 2/2006 | Boris et al. | |
| 2006/0047813 A1 * | 3/2006 | Aggarwal et al. | 709/226 |
| 2006/0101224 A1 * | 5/2006 | Shah et al. | 711/173 |
| 2006/0218533 A1 * | 9/2006 | Koduru et al. | 717/124 |
| 2006/0259328 A1 * | 11/2006 | Burd et al. | 705/2 |

FOREIGN PATENT DOCUMENTS

| | | |
|---|---|---|
| WO | 03079588 | 9/2003 |
| WO | 2006099586 | 9/2006 |
| WO | 2007140326 | 12/2007 |

OTHER PUBLICATIONS

Written Opinion, PCT/US07/069782, International Search Authority, European Patent Office, Nov. 8, 2007.

International Preliminary Report on Patentability, PCT/US07/069782, International Preliminary Examining Authority, United States, Nov. 28, 2008.

* cited by examiner

METHODS AND APPARATUS FOR SAMPLING USAGE INFORMATION FROM A POOL OF TERMINALS IN A DATA NETWORK

CLAIM OF PRIORITY UNDER 35 U.S.C. §119

The present application for patent claims priority to Provisional Application No. 60/808,615 filed May 25, 2006, and assigned to the assignee hereof and hereby expressly incorporated by reference herein.

BACKGROUND

I. Field

The present invention relates generally to information tracking in a network environment, and more particularly, to methods and apparatus for sampling usage information from a pool of terminals in a data network.

II. Description of the Related Art

Data networks, such as wireless communication networks, have to trade off between services customized for a single terminal and services provided to a large number of terminals. The distribution of content (data) to a large number of terminals (subscribers) is a complicated problem. Therefore, it is very important for network administrators and content providers to understand how well services are being provided over the network and how terminal users are utilizing the provided services.

Typically, network tracking systems monitor terminal interaction with a network server. For example, terminal users may contact the server to download applications, make content selections, answer survey questions, or to request any other type of service. The server may then track these requests to monitor what services are being delivered to users and to get some idea of user satisfaction from survey results.

Unfortunately, monitoring terminal usage at the server from terminal requests may not be very accurate and does not provide all the information that network administrators and content providers would like to have. For example, the server is limited to obtaining information from only those terminals that contact the server, and so information about non-requesting terminals may not be obtained. Additionally, the types of information that can be obtained may be limited. For example, the server may be able to determine what content is being delivered, but may not be able to determine how efficiently the content was delivered or how the content is being used at the terminal. Furthermore, current systems may not be able to gather information from the same terminals over a selected time period so that historical data can be assembled. Finally, the system may not protect the identity of the terminals it monitors so that the privacy of the terminal user may be at risk.

Therefore, what is needed is a usage tracking system for use in network environments that operates to track how well services are provided to one or more terminals and to monitor how terminal users utilized those services, so that network administrators and content providers can understand how such services may be improved. The system should operate to allow tracking of targeted groups of terminals so that historical usage data can be easily obtained. The system should also operate to protect the identity of the terminals and their users so that user privacy is maintained.

SUMMARY

In one or more embodiments, a usage tracking system, comprising methods and apparatus, is provided that operates to efficiently track usage information pertaining to one or more terminals in a data network. In one embodiment, the system employs selection logic that allows selected terminals to be targeted so that usage tracking data can be acquired from only those selected terminals. The selected terminals log usage data based on tracking parameters provided to the terminals. The system also includes identification mapping that operates to allow the identification of the tracking terminals to be protected so that usage information collected from those terminals remains private. The system is especially well suited for use in wireless networks where information pertaining to the activities of mobile terminals is especially valuable.

In one embodiment, a method is provided to perform usage tracking in a data network. The method comprises determining a targeted set of terminals from a pool of terminals on the data network, and transmitting tracking parameters to the pool of terminals. The method also comprises receiving tracking data from the targeted set of terminals, and mapping the identities of the targeted set of terminals to device log identifiers. The method also comprises associating the device log identifiers with the tracking data.

In one embodiment, apparatus is provided to perform usage tracking in a data network. The apparatus comprises selection logic that operates to determine a targeted set of terminals from a pool of terminals on the data network. The apparatus also comprises transmitting logic that operates to transmit tracking parameters to the pool of terminals, and receiving logic that operates to receive tracking data from the targeted set of terminals. The apparatus also comprises mapping logic that operates to map the identities of the targeted set of terminals to device log identifiers, and associate the device log identifiers with the tracking data.

In one embodiment, apparatus is provided to perform usage tracking in a data network. The apparatus comprises means for determining a targeted set of terminals from a pool of terminals on the data network, and means for transmitting tracking parameters to the pool of terminals. The apparatus also comprises means for receiving tracking data from the targeted set of terminals. The apparatus also comprises means for mapping the identities of the targeted set of terminals to device log identifiers, and means for associating the device log identifiers with the tracking data.

In one embodiment, a computer-readable media is provided that comprises instructions, which when executed by a processor, operate to perform usage tracking in a data network. The computer-readable media comprises instructions for determining a targeted set of terminals from a pool of terminals on the data network, and instructions for transmitting tracking parameters to the pool of terminals. The computer-readable media also comprises instructions for receiving tracking data from the targeted set of terminals. The computer-readable media also comprises instructions for mapping the identities of the targeted set of terminals to device log identifiers, and instructions for associating the device log identifiers with the tracking data.

In one embodiment, a method is provided for operating a terminal on a data network to perform usage tracking. The method comprises receiving tracking parameters, and determining whether the terminal is a targeted terminal. The method also comprises performing usage tracking according to the tracking parameters to determine tracking data if the terminal is a targeted terminal, and transmitting the tracking data on the data network.

In one embodiment, apparatus is provided to perform usage tracking in a data network. The apparatus comprises receiving logic that operates to receive tracking parameters.

The apparatus also comprises processing logic that operates to determine whether the terminal is a targeted terminal, and perform usage tracking according to the tracking parameters to determine tracking data if the terminal is a targeted terminal. The apparatus also comprises transmitting logic that operates to transmit the tracking data on the data network.

Other aspects, advantages, and features of the present invention will become apparent after review of the hereinafter set forth Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of a usage tracking system that operates to efficiently track usage information pertaining to one or more terminals in a data network. The system is especially well suited for use in wireless networks environments, but may be used in any type of network environment, including but not limited to, communication networks, public networks, such as the Internet, private networks, such as virtual private networks (VPN), local area networks, wide area networks, long haul network, or any other type of data network.

In one or more embodiments, the usage tracking system operates to collect usage statistics from one or more terminals in a data network. A usage tracking server is provided that operates to collect the usage statistics and store these statistics into a usage tracking database. Once collected, the usage statistics can be used to produce reports, historical data, or other summary information that may be used by information servers, advertisers, network administrators, content providers, or any other entity that may require usage information in the data network.

Figure 1:
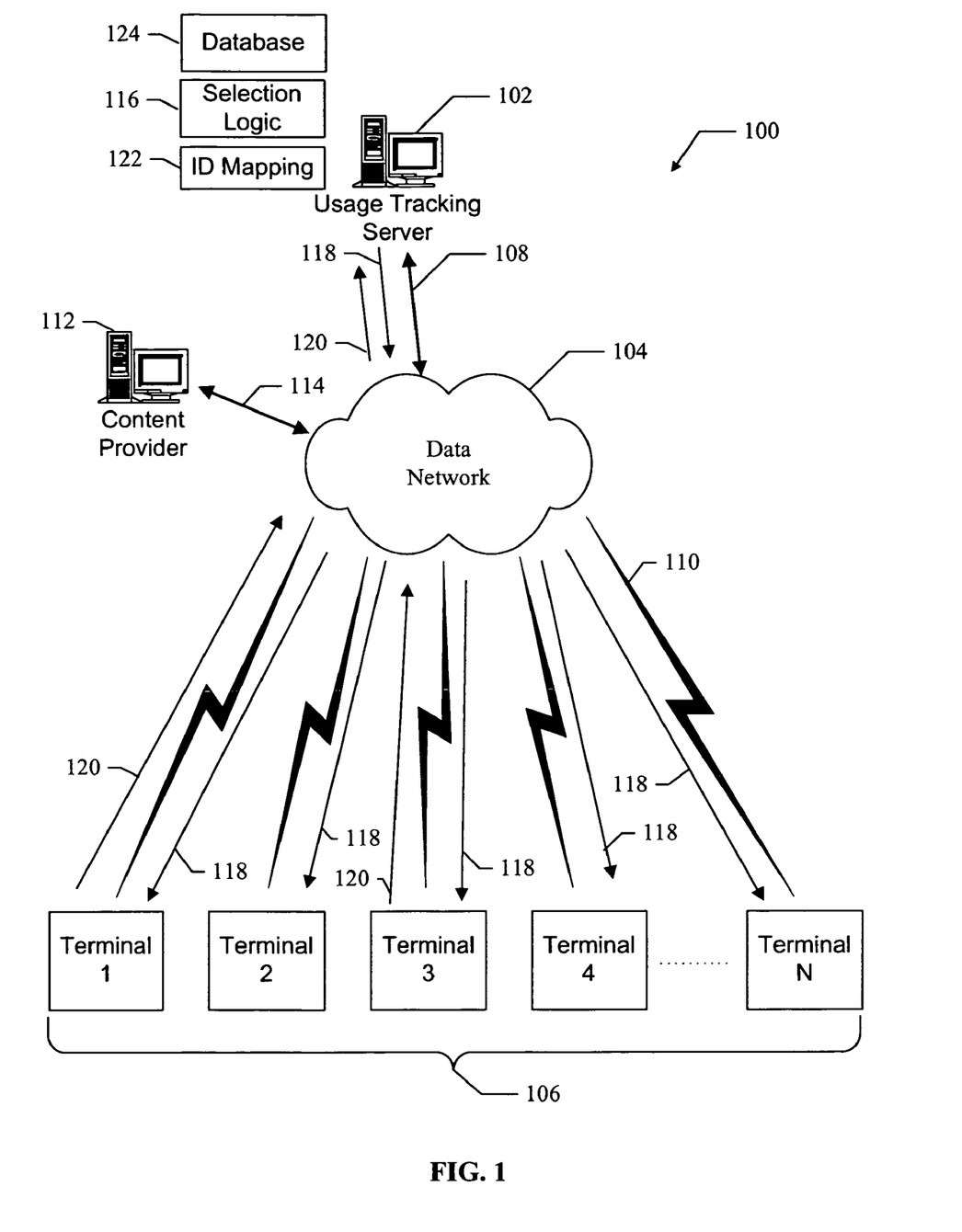
FIG. 1 shows a data network that comprises one embodiment of a usage tracking system.

FIG. 1 shows a data network 100 that comprises one embodiment of a usage tracking system. The network 100 comprises a usage tracking server 102, a data network 104, and a pool of terminals (1 thru N), as shown at 106. The data network 104 may be any type and/or combination of wired and/or wireless networks that allow data to be transmitted between the server 102 and the terminals 106. The server 102 communicates with the network 104 via the communication channel 108. The communication channel 108 may be any type of wired or wireless communication channel that allows the server 102 to communicate over the data network 104. The data network 104 provides communication with the terminals 106 via wireless communication links 110 that allow data to be wirelessly transmitted between the network 102 and the terminals 106. In one embodiment, the wireless communication links 110 comprise forward communication channels, reverse communication channels, control channels, and/or any other type of communication channel that may be used to communicate information between the network 104 and the terminals 106.

The network 100 also includes a content provider 112 that operates to provide content to entities in communication with the network 104, such as the terminals 106. For example, the content provider 112 communicates with the network 104 via the link 114 to provide applications, programs, multimedia content, or any other type of content and/or data for use by the terminals 106

The usage tracking server 102 comprises selection logic 116 that operates to select one or more of the terminals 106 for usage tracking. For example, the selection logic 116 selects a targeted set of terminals from the pool of terminals 106 and those targeted terminals will perform usage tracking based on parameters provided by the usage tracking server 102. For example, the server 102 transmits usage tracking parameters to all terminals of the pool of terminals 106, as shown at 118. Each of the terminals 106 processes the tracking parameters to determine if it is a targeted terminal and required to perform usage tracking. For example, in one embodiment, the tracking parameters include a sampling percentage or fraction indicator that specifies a response range. If a random number generated at each terminal is within the response range, then that terminal is a targeted terminal and performs usage tracking according to the tracking parameters. For example, in FIG. 1, all the terminals 106 receive the tracking parameters but only terminals 1 and 3 determine that they are targeted terminals and are required to perform usage-tracking. After the terminals 1 and 3 perform usage tracking according to the received usage tracking parameters, they transmit usage tracking data to the server 102, as shown at 120.

The server 102 also comprises identity (ID) mapping logic 122 that operates to map the identity of responding terminals (i.e., the terminals 1 and 3) so that the privacy of the usage tracking data they provide will be protected. For example, the mapping logic 122 associates the usage tracking data with device log identifiers that do not directly identify the source of the usage tracking data. The usage tracking data and device log identifiers are then stored in a usage tracking database 124. By storing the usage tracking data in the database 124, it is possible for the server 102 to construct a usage tracking history for any of the terminals 106.

Thus, in one or more embodiments, the usage tracking system operates to tracking the usage of one or more terminals in a data network. The resulting usage database may be used to generate reports for a variety of network entities, such as the content provider 112 and/or network administrators, advertisers, and any other entity interested in the operation of the network and/or the terminals 106.

An overview of the types of functions and information that may be collected during operation of the usage tracking system is provided in the following sections. However, it should be noted that the described information is intended to be illustrative and not limiting of the types of information that may be tracked and collected by the system. Thus, the system may operate to collect virtually any type of information available at a terminal device.

Usage Statistics

The usage tracking system can be used to collect various usage statistics, such as information about presentations viewed by the user of the terminal, the viewing duration of those presentations, or any other information. The usage tracking system can also be used to collect statistical information that can be used for optimizing any type of network services.

Statistical Sampling

The usage tracking system can operate using statistical sampling. For example, any percentage of the terminal population (targeted terminals) may be selected to log and return usage tracking data. Terminals may be selected randomly or by the use of any type of selection algorithm so that any type of probability sampling method may be implemented to select terminals to log usage data.

User Anonymity

The usage tracking system operates to ensure the privacy of the usage tracking data that is collected. For example, usage tracking data may be stored in an anonymous manner to protect the identity of the logging device and its user. In one embodiment, a terminal sends the logged usage data to a usage server in an identifiable manner. However, the usage server operates to generate a unique device log identifier from the terminal identifier to protect the identity of the terminal. For example, in one embodiment, a hashing algorithm is used to generate the unique device log identifier from the actual terminal identifier. Thus, it is computationally infeasible to determine the terminal identification from the unique device log identifier. The received tracking data is then stored along with the unique device log identifier in a database, and as a result, the data is not traceable to any particular terminal or user.

Enable/Disable

The usage tracking system operates so that terminals log usage data within selected logging windows. In one embodiment, the usage tracking system provides usage tracking parameters to the terminals to indicate when a terminal should initiate logging of usage data, the duration of the logging, etc. Once the logging window expires the terminal discontinues logging usage data. The terminal may also be instructed to discontinue logging before the logging window expires.

Usage Tracking Parameters

The usage tracking server conveys the usage tracking parameters to the terminals through an overhead notification mechanism. For example, the overhead notification mechanism may comprise a control channel that allows the usage server to communicate control information to the terminals. However, in one or more embodiments, the overhead notification mechanism may be any type of in-band or out-of-band communication channel between the usage tracking server and the terminals.

The usage tracking parameters are sent using the overhead notification mechanism and indicate to the terminal when it should initiate logging, duration of the logging, events, states to be logged, etc. The logging events or logging states determine what kind of usage data is to be logged. For example, logging events like a presentation viewing event indicate that data should be capture that describes how many times the user views a presentation, when the user views the presentations and so on. The logging event/state can be independently enabled or disabled through a logging mask.

The overhead notification mechanism carries the usage tracking parameters to each terminal. For example, the following is a sample list of parameters that may be sent to each terminal using the overhead notification mechanism. It should be noted that the following list is not exhaustive and that it is possible to send virtually any type of parameter to the terminals to control the data logging operation.

1. Logging Start time: Indicates when a terminal should commence the logging function.
2. Logging Window: Indicates the duration of the logging function.
3. Logging Mask: Indicates the Logging Events and States to be logged. Each Logging Event and State can be independently enabled or disabled through the logging mask.
4. Sampling Percentage: Indicates the percentage of the terminals that are required to log data. Sampling Percentage is used as a reference by the terminal to determine whether it should initiate logging or not. For example, if the sampling percentage or fraction is set to ten, approximately 10% of the terminals will log usage data. For example, in one embodiment, the terminals generate a random number uniformly distributed between 1 and 100. A terminal will only initiate the logging function if the random number generated is less than or equal to the sampling percentage (i.e., 10).
5. Seed: A Seed can be used to target the same as well as a different set of terminals to log usage information. In one embodiment, each terminal uses an exclusive-OR (EXOR) function to combine the Seed with the electronic serial number (ESN) of that terminal to generate the random number. The random number is then compared with the sampling percentage to decide whether the terminal needs to perform the logging function.
6. Log Size: This is the maximum amount of memory that the terminal reserves for storing the logged usage tracking data.
7. Logging Status: This parameter can take one of the three values.
   Logging ON: This value indicates to the terminal that the current usage tracking request is valid and that the terminal should continue logging.
   Stop logging and Send Log: This value indicates that the terminal should discontinue logging for the remaining period of the usage tracking notification. The terminal then uploads the logged data at the next packet data session.
   Stop logging and Discard Log: This value indicates that the terminal should stop logging for the remaining period of the usage tracking notification and delete the logged data.

In one or more embodiments, the tracking parameters may be in any suitable format and/or data type. For example, each tracking parameter may comprise a parameter identifier and a parameter value. The tracking parameters may be transmitted to the terminals in a single transmission or in multiple transmissions. Furthermore, any number of tracking parameters may be transmitted to the terminals and the tracking parameters may be updated at any time. For example, a set of tracking parameters may be transmitted to the terminals using the overhead notification mechanism, and thereafter, another set of tracking parameters may be transmitted, which operate to change, modify, add to, or delete from the previously transmitted set. Thus, the usage server operates to determine what tracking parameters to send to the terminals to perform the desired usage tracking operation.

A logging window defines a logging session that indicates the amount of time a terminal performs the logging function. In one embodiment, the system provides multiple logging sessions, however, it is preferable to have non-overlapping logging sessions, which means that there will be only one outstanding logging window active at each device at any instant of time. This avoids duplication of logged data in multiple logging windows. After the expiration of the logging window, whenever the terminal contacts the usage tracking server to request any updates, the terminal uses this same session to send the logged usage tracking data to the server. In one embodiment, the terminal piggybacks the logged data at the next packet data session with the server if the memory required to store the logged usage tracking data crosses a certain threshold percentage of the reserved memory. For example, after the terminal has stored enough data to fill eighty percent of the reserved memory (based on the log size), the terminal piggybacks the logged data at the next packet data session with the server.

Anonymous Logging

In one or more embodiments, the usage tracking system operates to protect the privacy rights of the terminal users. For example, in one embodiment, each terminal sends the logged usage data to the usage tracking server in an identifiable manner. On receiving the logged data, the usage tracking server generates a device log identifier using a hashing algorithm. The hashing algorithm is such that it is computationally infeasible to determine the terminal identity from the device log identifier. The inputs to the hashing algorithm are the actual terminal identifier and a subscriber identifier, since a combination of these identifiers uniquely identifies a terminal. The hashing algorithm ensures that the generated device log identifier is unique. The device log identifier can also be used to access and/or correlate tracking data received from a device as the result of a prior logging session.

In one or more embodiments, a variety of hashing algorithms may be used to generate the device log identifier, such as Rotating, One-Time-Hash, CRC-32, MD5, and SHA-1. However, taking into account the collision probability and the complexity of the hashing scheme, the hashing algorithm preferred for generation of the device log identifier is MD5 because the probability of collision for MD5 is very low.

Figure 2:
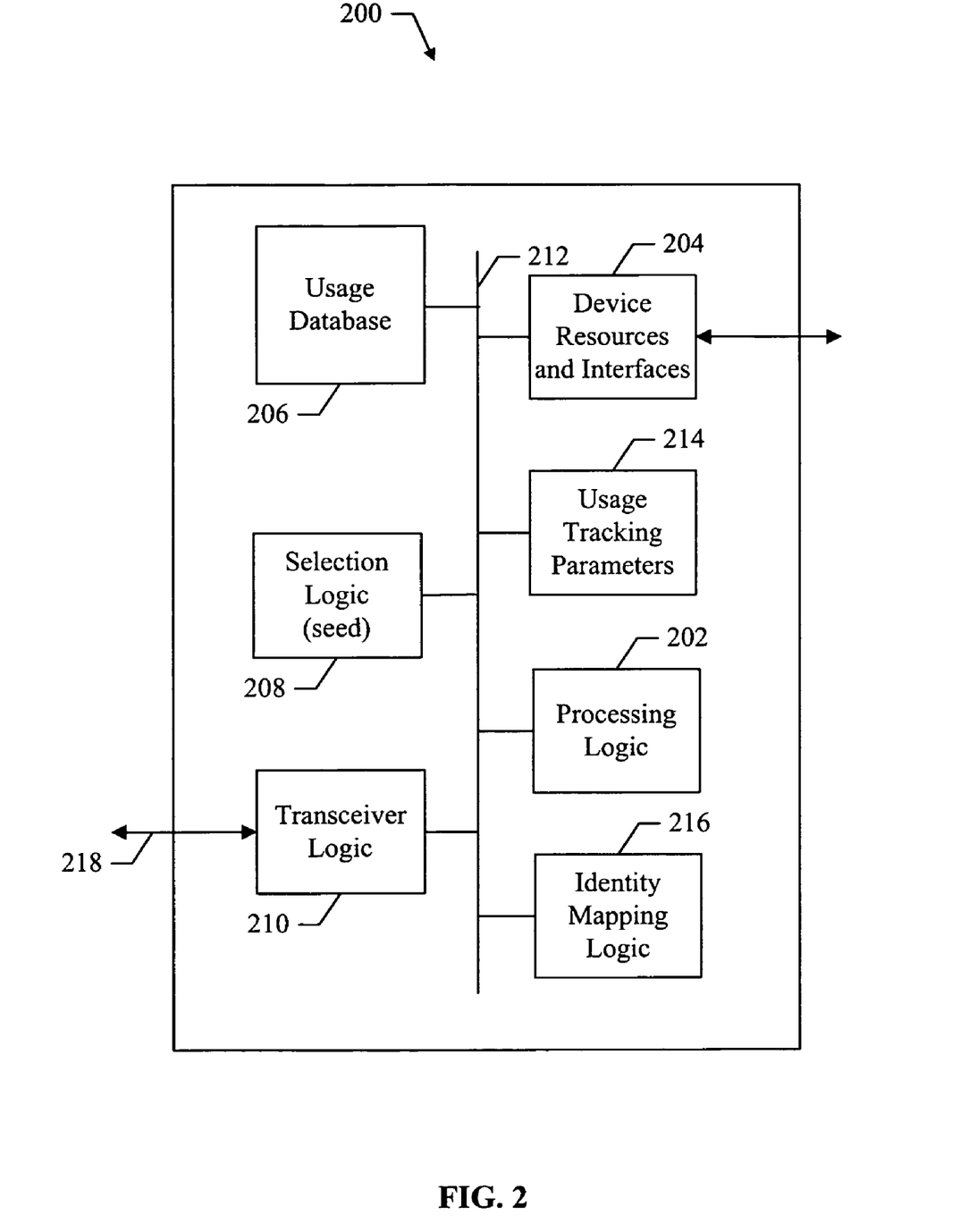
FIG. 2 shows a detailed diagram of one embodiment of a usage tracking server suitable for use in one embodiment of a usage tracking system.

FIG. 2 shows a detailed diagram of one embodiment of a usage tracking server 200 suitable for use in one embodiment of a usage tracking system. For example, the server 200 may be used as the server 102 in FIG. 1. The server 200 comprises processing logic 202, device resources 204, usage database 206, selection logic 208, and transceiver logic 210, all coupled to an internal data bus 212. The server 200 also comprises usage tracking parameters 214 and identity mapping logic 216, which are also coupled to the data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions to control one or more other functional elements of the server 200 via the internal data bus 212.

The device resources and interfaces 204 comprise hardware and/or software that allow the server 200 to communicate with internal and external systems. For example, internal systems may include mass storage systems, memory, display driver, modem, or other internal device resources. The external systems may include user interface devices, printers, disk drives, or other local devices or systems.

The usage database 206 comprises any type of memory device suitable for storing usage data received from one or more terminals in a data network. For example, the usage data may comprise statistics, device parameters, network parameters, or any other type of usage tracking data.

The usage tracking parameters 214 comprise parameters stored in any suitable memory device. The usage tracking parameters 214 represent information that describes how one or more terminals in a data network should operate to log usage tracking data. For example, in one embodiment, the usage tracking parameters 214 may indicate how a terminal device is to track and log the operation of an application program, or track and log the viewing of a presentation by the device user. The usage tracking parameters comprises any suitable format or data type, and any number of parameters may be transmitted by the server to the terminals in one or multiple transmissions.

The transceiver logic 210 comprises hardware and/or software that operates to allow the server 200 to transmit and receive data and/or other information with remote devices or systems via communication channel 218. For example, in one embodiment, the communication channel 218 comprises a control channel to transmit control information to remote devices. For example, in one embodiment, the control channel may be used to transmit the usage tracking parameters to one or more terminals on a data network.

The selection logic 208 comprises hardware and/or software that operates to allow the server 200 to select one or more terminals in a data network for usage tracking. For example, in one embodiment, the selection logic 210 uses a percentage indicator to indicate what percent of the existing pool of terminals should perform usage tracking. For example, the percentage indicator is transmitted to the terminals as part of the tracking parameters. The terminals generate a random number that is compared to the percentage indicator. If the random number is within the range of the percentage indicator, then the terminal will perform usage tracking. In another embodiment, the selection logic 210 utilizes a "seed" value that targets one or more terminals. For example, in one embodiment, the seed value is transmitted as part of the tracking parameters and each terminal uses an exclusive-OR (EXOR) function to combine the seed value with the electronic serial number (ESN) of that terminal to generate the random number. The random number is then compared with the sampling percentage to decide whether the terminal needs to perform the logging function. Such a technique is a repeatable or "deterministic" function because allows the selection logic 210 to select the same set of target terminals for multiple tracking sessions. This allows historical tracking data for any terminal to be collected. However, the selection logic 210 is not limited to using any particular selection scheme so that any suitable type of selection technique may be used by the selection logic 210 to select the targeted set of terminals.

The identity mapping logic 216 comprises a CPU, processor, gate array, hardware logic, memory elements, virtual machine, software, and/or any combination of hardware and software. The identity mapping logic 216 operates to map the identity of terminals that transmit usage data to the server. For example, in one embodiment, the identity mapping logic 216 uses a hashing function to process the original identity of a terminal to produce a device log identity that is associated with the usage tracking data provided by that terminal. The tracking data and device log identity are then stored in the usage database 206 for later processing.

During operation of the server 200, the selection logic 208 determines a targeted set of terminals to perform usage tracking. The targeted set of terminals may comprise one or more terminals from an available pool of terminals. Usage tracking parameters are assembled so that the targeted set of terminals will be activated to perform usage tracking. For example, a selection percentage indicator is included in the tracking parameters to activate the targeted set of terminals. The tracking parameters are transmitted to all terminals in the pool of terminals via an overhead notification mechanism. Each receiving terminal processes the tracking parameters to determine if it is a targeted terminal. For example, in one embodiment, each terminal processes the selection percentage indicator to determine if it is a targeted terminal. If a terminal determines that it is a targeted terminal, it performs usage tracking according to the tracking parameters. After the targeted terminals perform the requested usage tracking they transmit the resulting usage tracking data to the server where the identity of the targeted terminals is mapped to device log identifiers by the mapping logic 216. The usage data and the device log identifiers are then stored in the usage database 206.

In one embodiment, the usage tracking system comprises program instructions stored on a computer-readable media, which when executed by the processing logic 202, provides the functions of the server 200 described herein. For example, instructions may be loaded into the server 200 from a computer-readable media, such as a floppy disk, CDROM, memory card, FLASH memory device, RAM, ROM, or any other type of memory device or computer-readable media that interfaces to the server 200 via the device resources 204. In another embodiment, the instructions may be downloaded into the server 200 from a network resource that interfaces to the sever 200 via the transceiver logic 210. The instructions, when executed by the processing logic 202, provide one or more embodiments of a usage tracking system as described herein.

Figure 3:
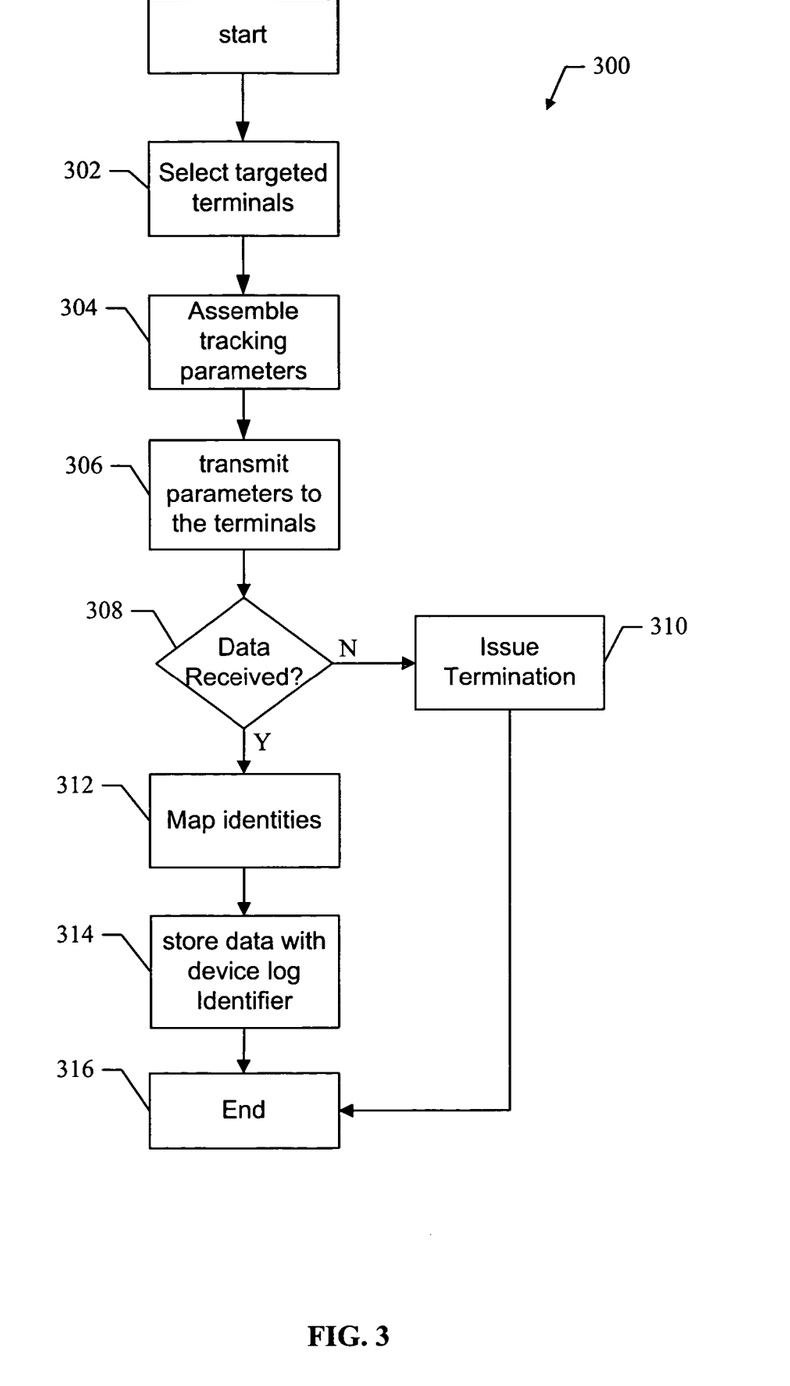
FIG. 3 shows one embodiment of a method for operating a server in one embodiment of a usage tracking system.

FIG. 3 shows one embodiment of a method 300 for operating a server in one embodiment of a usage tracking system. For clarity, the method 300 will be described with reference to the server 200 shown in FIG. 2. In one or more embodiments, the processing logic 202 executes program instructions to perform the functions described below.

At block 302, a set of terminals is targeted for usage tracking. For example, in one embodiment, the processing logic 202 controls the selection logic 208 to select a targeted set of terminals. The selection logic 208 may use a percentage indicator or a seed value to determine a set of terminals that will be requested to perform usage tracking. Virtually any technique may be used to select the targeted set of terminals, including repeatable or deterministic functions that allow the same terminals to be repeatedly selected.

At block 304, usage tracking parameters are assembled that are to be transmitted to the terminals. For example, the processing logic 202 assembles the parameters to be transmitted as the usage tracking parameters 214. The tracking parameters indicate which terminals are to perform usage tracking, and how usage tracking is to be performed by those terminals.

At block 306, the assembled usage tracking parameters are transmitted to the terminals. In one embodiment, the tracking parameters are transmitted only to the targeted terminals. In another embodiment, the tracking parameters are transmitted to all terminal in a pool of terminals. For example, the processing logic 202 controls the transceiver 210 to transmit the parameters via the communication channel 210. In one embodiment, the parameters are transmitted to the terminals via a control channel. In one embodiment, the parameters are transmitted using any type of overhead notification mechanism. Furthermore, the parameters may be transmitted in one or more transmissions and updated as necessary.

At block 308, a test is performed to determine whether usage tracking data has be received at the server. For example, each of the targeted terminals performs usage tracking to obtain logged tracking data according to the usage tracking parameters. Once the tracking data is acquired, the terminals transmit the logged data to the server. If the tracking data is received at the server, the method proceeds to block 312. If the tracking data is not received, the method proceeds to block 310.

At block 310, it is possible for the usage server to terminate any pending tracking operation. In one embodiment, the server disables terminal logging by causing an early expiration of the logging window before its scheduled expiration time. For example, the usage tracking server sets the logging window parameter to zero and transmits this parameter to the terminal, which causes the terminal to terminate any pending usage tracking. However, this termination technique does not provide any information to the terminal about what needs to be done with any data that has already been logged. Thus, the logged data could either be discarded or be uploaded to the usage tracking server in another communication session with the server.

In another embodiment, an additional usage tracking parameter referred to as Logging Status is transmitted to the terminal. The Logging Status field indicates to the terminal whether the terminal should discontinue logging and provides information on whether the logged data should be discarded. For example, if it is required that the terminal discard the logged data, the Logging Status field can be set to "Stop Logging and Discard Log." When the terminal receives the updated parameters, depending upon the "Logging Status" value it either piggybacks the logged data in a transmission to the server or discards it. The method then proceeds to block 316.

At block 312, the identities of the responded terminals are mapped to device log identifiers. For example, in one embodiment, the identity mapping logic uses a hash function to map the identity of a terminal to a device log identity. The hash function takes the true identity of the terminal as input, and generates the device log identity. The device log identity cannot be reversed to discover the true identity of the terminal. Although a hash function has been described, it is possible to use any suitable identity mapping technique to protect the identity of the responding terminals.

At block 314, the usage tracking data from responding terminals is associated with the appropriate device log identifiers. The data and the device log identifiers are then stored in the usage database 206 and the method proceeds to block 316 where any received usage tracking data can now be processed. For example, the server 200 may now create usage reports from the received usage tracking data. The usage reports will reference the device log identifiers so that the privacy of the actual terminals is protected from disclosure.

It should be noted that the method 300 illustrates just one embodiment and that changes, additions, or rearrangements of the flow elements may be made without deviating from the scope of the described embodiments.

Figure 4:
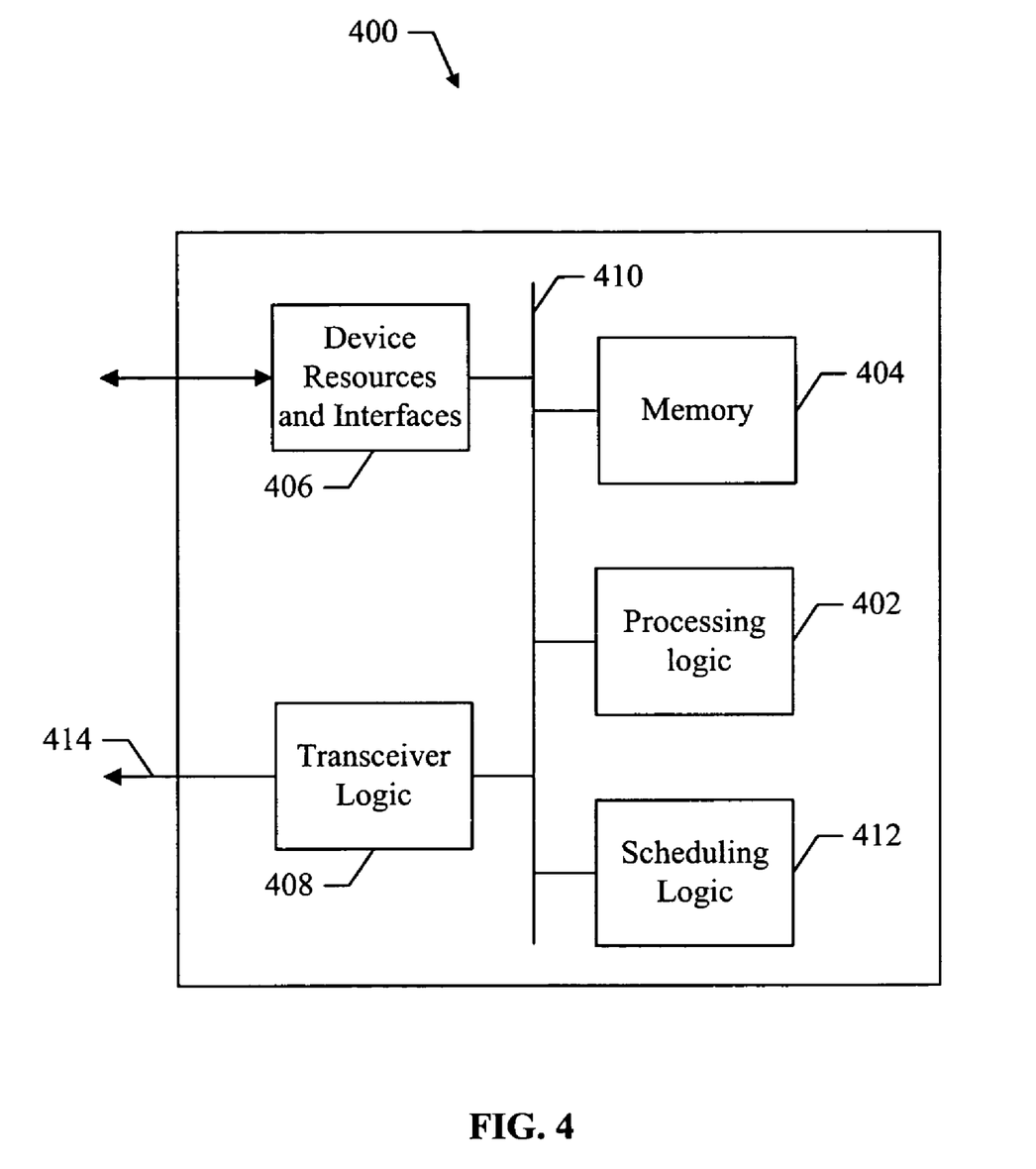
FIG. 4 shows a detailed diagram of one embodiment of a terminal suitable for use in one embodiment of a usage tracking system.

FIG. 4 shows a detailed diagram of one embodiment of a terminal 400 suitable for use in one embodiment of a usage tracking system. The terminal 400 comprises processing logic 402, memory 404, device resources and interfaces 406, transceiver logic 408, all coupled to a data bus 410. The terminal 400 also comprises scheduling logic 412, which is also coupled to the data bus 410.

In one or more embodiments, the processing logic 402 comprises a CPU, processor, gate array, hardware logic, memory elements, virtual machine, software, and/or any combination of hardware and software. Thus, the processing logic 402 generally comprises logic to execute machine-readable instructions to control one or more other functional elements of the terminal 400 via the internal data bus 410.

The device resources and interfaces 406 comprise hardware and/or software that allow the terminal 400 to communicate with internal and external systems. For example, internal systems may include mass storage systems, memory, display driver, modem, or other internal device resources. The external systems may include user interface devices, printers, disk drives, or other local devices or systems.

The transceiver logic 408 comprises hardware and/or software that operates to allow the terminal 400 to transmit and receive data and/or other information with external devices or systems via communication channel 414. For example, the transceiver logic 408 may comprise control channel logic to receive control information from a remote server. The control channel logic may comprise any suitable hardware and/or software and implement any type of control channel suitable for exchanging information with a remote server.

The memory 404 comprises any type of memory suitable for storing information at the terminal 400. For example, the terminal 400 may operate to log usage data according to usage parameters and store the usage data in the memory 404 for further processing.

The scheduling logic 414 operates to schedule logging of usage data according to usage parameters. For example, the scheduling logic 414 may receive the usage parameters via a transmission from a usage server. The usage parameters describe how, what, and when the terminal 400 will log usage data. If the usage parameters identify a time window within which the data should be logged, the scheduling logic 412 alerts the processing logic 402 to log the data within the defined time window.

During operation, the terminal 400 operates according to one or more embodiments of a usage tracking system to log usage data. In one embodiment, the terminal performs one or more of the following functions to log the usage data. It should be noted that the following functions may be changed, rearranged, modified, add to, or otherwise adjusted within the scope of the embodiments.

1. The terminal receives tracking parameters via an overhead notification mechanism.
2. The terminal determines from the tracking parameters whether it is a targeted terminal.
3. If the terminal is a targeted terminal, it determines from the tracking parameters what information is to be tracked and when the tracking should occur. The terminal may also obtain other information or instructions from the tracking parameters.
4. The terminal then performs usage tracking according to the tracking parameters and stores the logged tracking data into its local memory.
5. When tracking is complete, the terminal transmits the logged tracking data to a usage tracking server.

In one embodiment, the usage tracking system comprises program instructions stored on a computer-readable media, which when executed by the processing logic 402, provides the functions of the terminal 400 described herein. For example, instructions may be loaded into the terminal 400 from a computer-readable media, such as a floppy disk, CDROM, memory card, FLASH memory device, RAM, ROM, or any other type of memory device or computer-readable media that interfaces to the terminal 400 via the device resources 406. In another embodiment, the instructions may be downloaded into the terminal 400 from a network resource that interfaces to the terminal 400 via the transceiver logic 408. The instructions, when executed by the processing logic 402, provide one or more embodiments of a usage tracking system as described herein.

Figure 5:
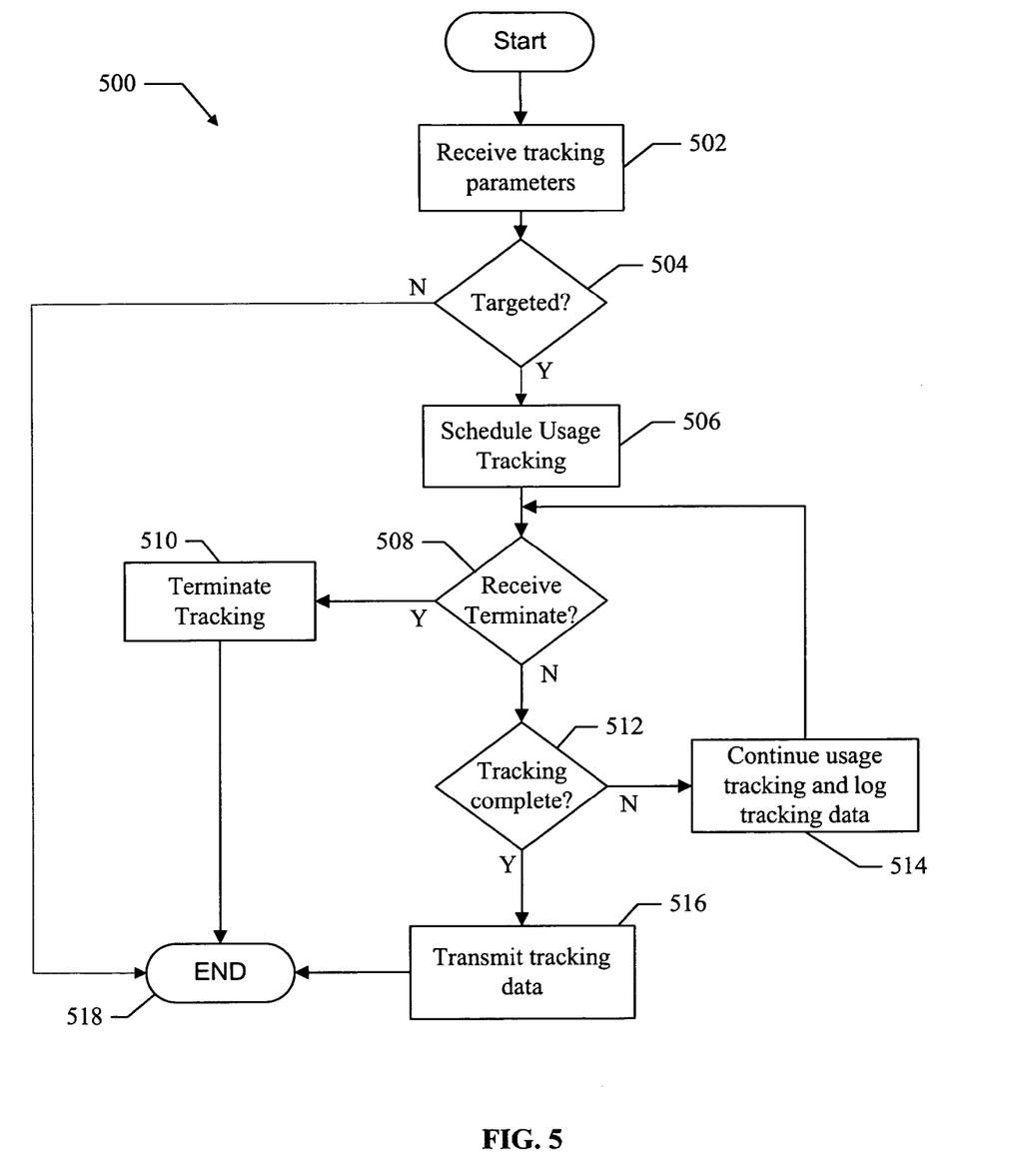
FIG. 5 shows one embodiment of a method for operating a terminal in one embodiment of a usage tracking system.

FIG. 5 shows one embodiment of a method 500 for operating a terminal in one embodiment of a usage tracking system. For clarity, the method 500 will be described with reference to the terminal 400 shown in FIG. 4. In one or more embodiments, the processing logic 402 executes program instructions to perform the functions described below.

At block 502, tracking parameters are received at the terminal from a usage server in a data network. For example, the processing logic 402 receives the tracking parameters via an overhead notification mechanism that may comprise a control channel that is part of the transceiver logic 408. In one embodiment, the tracking parameters describe when and what usage data will be logged at the terminal. The tracking parameters are stored in the memory 404.

At block 504, a test is performed to determine if the terminal has been selected as a targeted terminal. For example, the processing logic 402 processes the tracking parameters to determine if the terminal is a targeted terminal. In one embodiment, the processing logic 402 generates a random number that is compared to a percentage indicator included in the tracking parameters. If the random number is within a selected range defined by the percentage indicator, then the terminal is a targeted terminal. In another embodiment, the tracking parameters include a seed value and the processing logic 402 combines the seed value with a terminal identifier to generate a selection indicator that is then compared to the percentage indicator. If the selection indicator is within a selected range defined by the percentage indicator, then the terminal is a targeted terminal. Thus, any suitable technique may be used by the terminal to determine if it is a targeted terminal.

At block 506, the usage tracking at the terminal is scheduled. For example, the scheduling logic 412 operates to schedule usage tracking according to the tracking parameters stored in the memory 404. For example, the tracking parameters may include a time window indicator that identifies a time period when usage tracking should occur. The scheduling logic 412 processes the time window indicator to schedule usage tracking.

At block 506, a test is performed to determine if the terminal has received any tracking parameters that will terminate any pending usage tracking. For example, the usage server may terminate usage tracking by transmitting updated tracking parameters to the terminal. In one embodiment, the server transmits tracking parameters that set the time window indicator to zero. In response, the terminal terminates any pending usage tracking and either discards any collected data or sends it to the server in their next communication session. If usage tracking is terminated, the method proceeds to block 510. If usage tracking has not been terminated, the method proceeds to block 512.

At block 510, usage tracking is terminated and any logged data will either be transmitted to the usage server at the next available communication or discarded. In one embodiment, the processing logic 402 processes the logging status tracking parameter to determine how to handle previously logged tracking data. The method then ends at block 518.

At block 512, a test is performed to determine if the usage tracking is complete. For example, in one embodiment, usage tracking is scheduled to occur within a selected time window. If usage tracking has occurred during the time window and the time window has expired, then the usage tracking is complete. In one embodiment, the terminal may be realized that the usage tracking data is no longer of interest, and as a result, the terminal stop logging and either discards the logged usage tracking data or attempts to upload the available data. If the usage tracking is complete, the method proceeds to block 516. If the usage tracking is not complete, the method proceeds to block 514.

At block 514, the terminal continues logging usage data in accordance with the tracking parameters. For example, in one embodiment, the processing logic 402 retrieves the tracking parameters from the memory 404 and logs device usage accordingly. The logged tracking data is then stored in the memory 404 until the tracking is terminated or the tracking window expires. The method proceeds to block 508 where a test is performed to determine if a terminal instruction has been received.

At block 516, usage tracking is completed and the terminal transmits the usage tracking data to the usage server. For example, the tracking data is transmitted during communications between the terminal and the usage server. In one embodiment, the tracking data is transmitted in an identifiable manner and the server operates to map the identity of the terminal to a device log identifier that protects the identity of the terminal.

Thus, the method 500 operates to allow a terminal to receive tracking parameters and perform usage tracking accordingly. It should be noted that the method 500 illustrates just one embodiment and that changes, additions, or rearrangements of the flow elements may be made without deviating from the scope of the described embodiments.

Accordingly, while one or more embodiments of a usage tracking system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. A method for performing usage tracking of wireless terminals in a data network, the method comprising:
    determining a set of targeted wireless terminals from a plurality of wireless terminals;
    transmitting tracking parameters to each of the plurality of wireless terminals, the tracking parameters enabling each of the plurality of wireless terminals to determine whether it is a targeted wireless terminal and indicating usage tracking to be performed by a target wireless terminal;
    receiving tracking data from targeted wireless terminals;
    mapping identities of each targeted wireless terminal to a device log identifier so as to retain anonymity of the targeted wireless terminals; and
    associating the device log identifiers with the tracking data from the corresponding targeted wireless terminal.

2. The method of claim 1, wherein the step of determining comprises determining the set of targeted wireless terminals using a deterministic function so that the same wireless terminals may be targeted over multiple usage tracking sessions.

3. The method of claim 2, wherein the deterministic function utilizes a seed value.

4. The method of claim 1, further comprising storing the tracking data with the associated device log identifiers in a database.

5. The method of claim 1, wherein the step of determining comprises identifying a percentage of the plurality of terminals to be included in the set of targeted wireless terminals.

6. The method of claim 1, wherein the step of transmitting comprises transmitting the tracking parameters to each of the plurality of wireless terminals using an overhead notification mechanism.

7. The method of claim 1, wherein the step of mapping comprises hashing identifiers of targeted wireless terminals.

8. The method of claim 1, wherein the step of transmitting further comprises transmitting a time window indicator as part of the tracking parameters.

9. The method of claim 1, further comprises transmitting a terminate tracking parameter to a targeted wireless terminal.

10. Apparatus to perform usage tracking wireless terminals in a data network, the apparatus comprising:
    means for determining a set of targeted wireless terminals from plurality of wireless terminals;
    means for transmitting tracking parameters to each of the plurality of wireless terminals, the tracking parameters enabling each of the plurality of wireless terminals to determine whether it is a targeted wireless terminal and indicating usage tracking to be performed by a targeted wireless terminal;
    means for receiving tracking data from targeted wireless terminals;
    means for mapping identities of each targeted wireless terminal to a device log identifier so as to retain anonymity of the targeted wireless terminals; and
    means for associating the device log identifiers with the tracking data from the corresponding targeted wireless terminal.

11. The apparatus of claim 10, wherein the means for determining comprises means for determining the set of targeted terminals using a deterministic function so that the same terminals may be targeted over multiple usage tracking sessions.

12. The apparatus of claim 11, wherein the deterministic function utilizes a seed value.

13. The apparatus of claim 10, further comprising means for storing the tracking data with the associated device log identifiers in a database.

14. The apparatus of claim 10, wherein the means for determining comprises means for identifying a percentage of the plurality of wireless terminals to be included in the set of targeted wireless terminals.

15. The apparatus of claim 10, wherein the means for transmitting comprises means for transmitting the tracking parameters to each of the plurality of wireless terminals using an overhead notification mechanism.

16. The apparatus of claim 10, wherein the means for mapping comprises means for hashing identifiers of the targeted set of wireless terminals.

17. The apparatus of claim 10, wherein the means for transmitting further comprises means for transmitting a time window indicator as part of the tracking parameters.

18. The apparatus of claim 10, further comprises means for transmitting a terminate tracking parameter to a targeted wireless terminal.

19. A computer-readable media storing instructions, which when executed by a processor, operate to perform usage tracking of wireless terminals in a data network, the instructions including:
    instructions for determining a set of targeted wireless terminals from a plurality of wireless terminals;
    instructions for transmitting tracking parameters to each of the plurality of wireless terminals, the tracking parameters enabling each of the plurality of wireless terminals to determine whether it is a targeted wireless terminal and indicating usage tracking to be performed by a targeted wireless terminal;
    instructions for receiving tracking data from targeted wireless terminals;
    instructions for mapping an identity of each targeted wireless terminal to a device log identifier so as to retain anonymity of the targeted wireless terminals; and instructions for associating the device log identifiers with the tracking data from the corresponding targeted wireless terminal.

20. The computer-readable media of claim 19, further comprising instructions for storing the tracking data with the associated device log identifiers in a database.

21. The computer-readable media of claim 19, wherein the instructions for determining comprise identifying a percentage of the plurality of terminals to be included in the set of targeted wireless terminals.

22. The computer-readable media of claim 19, wherein the instructions for determining comprise using a deterministic function so that the same wireless terminals may be targeted over multiple usage tracking sessions.

23. The computer-readable media of claim 19, wherein the deterministic function utilizes a seed value.

24. The computer-readable media of claim 19, wherein the instructions for transmitting comprise instructions for transmitting the tracking parameters to the plurality of wireless terminals using an overhead notification mechanism.

25. The computer-readable media of claim 19, wherein the instructions for mapping comprise instructions for hashing identifiers of the set of targeted wireless terminals.

26. The computer-readable media of claim 19, wherein the instructions for transmitting further comprise instructions for transmitting a time window indicator as part of the tracking parameters.

27. The computer-readable media of claim 19, further comprising instructions for transmitting a terminate tracking parameter to a targeted wireless terminal.

28. A method for operating a wireless terminal on a data network to perform usage tracking, the method comprising:

receiving tracking parameters by the wireless terminal;
using the tracking parameters for determining whether the wireless terminal is a targeted terminal;
if the wireless terminal is a targeted terminal, performing usage tracking based on the tracking parameters to generate tracking data; and
transmitting the tracking data on the data network.

29. The method of claim 28, wherein the tracking parameters comprise a time window indicator and the method further comprises performing usage tracking during a time period defined by the time window indicator to determine the tracking data.

30. The method of claim 28, further comprising terminating any pending usage tracking upon the receipt of a terminate parameter.

31. The method of claim 28, wherein the step of transmitting comprises transmitting the tracking data with a terminal identifier.

32. The method of claim 28, wherein the step of determining whether the wireless terminal is a targeted wireless terminal comprises comparing a generated random number to an indicator included with the tracking parameters.

33. The method of claim 28, wherein the step of determining whether the wireless terminal is a targeted wireless terminal comprises determining whether the wireless terminal is a wireless targeted terminal based on a seed value.

34. The method of claim 28, wherein the step of receiving comprises receiving the tracking parameters via an overhead notification mechanism.

* * * * *